United States Patent
Wang et al.

(10) Patent No.: US 10,198,173 B2
(45) Date of Patent: *Feb. 5, 2019

(54) USER INPUT

(71) Applicant: Nokia Technologies Oy, Espoo (FI)

(72) Inventors: Wei Wang, Beijing (CN); Kongqiao Wang, Beijing (CN); Xiaohui Xie, Beijing (CN); Yingfei Liu, Beijing (CN); Xia Wang, Beijing (CN); Huanglingzi Liu, Beijing (CN); Bin Wang, Shanghai (CN); Zhen Liu, Tarrytown, NY (US); Yuezhong Tang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 279 days.

This patent is subject to a terminal disclaimer.

(21) Appl. No.: 14/966,940

(22) Filed: Dec. 11, 2015

(65) Prior Publication Data

US 2016/0179329 A1    Jun. 23, 2016

Related U.S. Application Data

(63) Continuation of application No. 13/522,915, filed as application No. PCT/CN2010/070286 on Jan. 20, 2010, now Pat. No. 9,235,341.

(51) Int. Cl.
*G06F 3/041* (2006.01)
*G06F 3/0488* (2013.01)
(Continued)

(52) U.S. Cl.
CPC .......... *G06F 3/0488* (2013.01); *G06F 3/0486* (2013.01); *G06F 3/04842* (2013.01);
(Continued)

(58) Field of Classification Search
CPC .............. G06F 3/0486; G06F 3/04883; G06F 2203/04808; H04M 2250/22; H04M 1/72583
(Continued)

(56) References Cited

U.S. PATENT DOCUMENTS 5,612,719 A    3/1997  Beemink et al.
5,784,061 A    7/1998  Moran et al.
(Continued)

FOREIGN PATENT DOCUMENTS

CN    1129889 A    8/1996
CN    1326564 A    12/2001
(Continued)

OTHER PUBLICATIONS

Extended European Search Report for Application No. 10845021.4 dated Feb. 2, 2016.
(Continued)

*Primary Examiner* — Prabodh M Dharia
(74) *Attorney, Agent, or Firm* — Alston & Bird LLP

(57) ABSTRACT

An apparatus, method and computer program product are caused at least to perform: controlling a touch sensitive display to display a first graphical item at a first position and a second graphical item at a second position, the second graphical item being separated from the first graphical item by a first distance; detecting a first user digit at the first position and a second user digit at the second position; reducing the first distance by moving at least one of the first and second graphical items across the touch sensitive display, in response to detecting movement, across the touch sensitive display, of at least one of the first and second user digits; and controlling the touch sensitive display to display
(Continued)

a third graphical item, after determining the first distance has been reduced such that the first graphical item is proximate the second graphical item.

20 Claims, 6 Drawing Sheets

(51) Int. Cl.
    *G06F 3/0486*      (2013.01)
    *G06F 3/0484*      (2013.01)
    *H04M 1/725*      (2006.01)

(52) U.S. Cl.
    CPC ............... *G06F 3/04883* (2013.01); *G06F 2203/04808* (2013.01); *H04M 1/72583* (2013.01); *H04M 2250/22* (2013.01)

(58) Field of Classification Search
    USPC ............ 345/156–184; 715/765, 769; 702/44; 370/352
    See application file for complete search history.

(56) References Cited

U.S. PATENT DOCUMENTS

| | | | |
|---|---|---|---|
| 5,801,699 A | 9/1998 | Hocker et al. | |
| 5,815,142 A | 9/1998 | Allard et al. | |
| 5,838,820 A | 11/1998 | Bergman | |
| 5,861,886 A | 1/1999 | Moran et al. | |
| 5,912,668 A | 6/1999 | Sciammarella et al. | |
| 6,590,568 B1 | 7/2003 | Astala et al. | |
| 6,826,443 B2 | 11/2004 | Makinen | |
| 6,857,106 B1 | 2/2005 | Brouaux | |
| 7,469,381 B2 | 12/2008 | Ording | |
| 7,552,399 B2 | 6/2009 | Muller et al. | |
| 7,908,569 B2 | 3/2011 | Ala-Rantala | |
| 8,160,056 B2* | 4/2012 | Van der Merwe | H04L 45/04 370/351 |
| 8,209,160 B2 | 6/2012 | Kreitzer | |
| 8,266,550 B1 | 9/2012 | Cleron et al. | |
| 8,392,849 B2 | 3/2013 | Jung | |
| 8,402,382 B2 | 3/2013 | Agarawala et al. | |
| 8,429,565 B2 | 4/2013 | Agarawala et al. | |
| 8,453,055 B2 | 5/2013 | Oh | |
| 8,502,864 B1 | 8/2013 | Watkins | |
| 8,651,096 B2 | 2/2014 | Sikes | |
| 8,656,314 B2 | 2/2014 | Locker et al. | |
| 8,656,350 B2 | 2/2014 | Bates et al. | |
| 8,863,016 B2 | 10/2014 | Victor | |
| 8,997,018 B2 | 3/2015 | Cheng | |
| 9,235,341 B2 | 1/2016 | Wang et al. | |
| 2002/0018051 A1 | 2/2002 | Singh | |
| 2002/0057263 A1 | 5/2002 | Keely et al. | |
| 2005/0160370 A1 | 7/2005 | Talley et al. | |
| 2007/0132767 A1 | 6/2007 | Wright et al. | |
| 2007/0132789 A1 | 6/2007 | Ording et al. | |
| 2007/0177804 A1 | 8/2007 | Elias et al. | |
| 2007/0198561 A1 | 8/2007 | Lee et al. | |
| 2008/0042984 A1 | 2/2008 | Lim et al. | |
| 2008/0088582 A1 | 4/2008 | Prest et al. | |
| 2008/0094369 A1 | 4/2008 | Ganatra et al. | |
| 2008/0105749 A1* | 5/2008 | Lei | G06K 7/10722 235/462.42 |
| 2008/0126937 A1 | 5/2008 | Pachet | |
| 2008/0158185 A1 | 7/2008 | Westerman | |
| 2008/0168403 A1 | 7/2008 | Westerman et al. | |
| 2008/0255782 A1 | 10/2008 | Bilac et al. | |
| 2008/0295012 A1 | 11/2008 | Sloo et al. | |
| 2009/0007017 A1 | 1/2009 | Anzures et al. | |
| 2009/0019385 A1 | 1/2009 | Khatib et al. | |
| 2009/0138823 A1 | 5/2009 | Bradea | |
| 2009/0228820 A1 | 9/2009 | Kim et al. | |
| 2010/0138763 A1 | 6/2010 | Kim | |
| 2010/0162151 A1 | 6/2010 | Class et al. | |
| 2010/0175027 A1* | 7/2010 | Young | G06F 3/0485 715/830 |
| 2010/0207858 A1 | 8/2010 | Chen et al. | |
| 2010/0229129 A1 | 9/2010 | Price et al. | |
| 2010/0231533 A1 | 9/2010 | Chaudhri | |
| 2010/0246571 A1 | 9/2010 | Geppert et al. | |
| 2010/0281408 A1 | 11/2010 | Fujioka et al. | |
| 2010/0318905 A1 | 12/2010 | Rakesh | |
| 2011/0029904 A1 | 2/2011 | Smith et al. | |
| 2011/0061012 A1 | 3/2011 | Lim et al. | |
| 2011/0078109 A1 | 3/2011 | Griggs et al. | |
| 2011/0169760 A1 | 7/2011 | Largillier | |
| 2011/0189440 A1* | 8/2011 | Appleby | B22C 9/04 428/156 |
| 2011/0202848 A1 | 8/2011 | Ismalon | |
| 2011/0289459 A1 | 11/2011 | Athans et al. | |
| 2012/0005622 A1 | 1/2012 | Park et al. | |
| 2012/0112999 A1 | 5/2012 | Braun et al. | |
| 2012/0131500 A1 | 5/2012 | Fujisawa | |
| 2012/0258776 A1 | 10/2012 | Lord et al. | |
| 2012/0306784 A1* | 12/2012 | Axelsson | G06F 3/0486 345/173 |
| 2013/0338267 A1 | 12/2013 | Appleby et al. | |
| 2014/0013283 A1* | 1/2014 | Matas | G06T 11/60 715/853 |
| 2015/0169099 A1* | 6/2015 | Lavallee | G06F 9/543 345/173 |
| 2017/0067624 A1* | 3/2017 | Dahlen | H05B 37/00 |

FOREIGN PATENT DOCUMENTS

| | | |
|---|---|---|
| CN | 101017498 A | 8/2007 |
| CN | 101221477 A | 7/2008 |
| CN | 101281443 A | 10/2008 |
| CN | 101308443 A | 11/2008 |
| CN | 101344848 A | 1/2009 |
| CN | 101356492 A | 1/2009 |
| CN | 101410781 A | 4/2009 |
| CN | 101561758 A | 10/2009 |
| EP | 0 698 845 A1 | 2/1996 |
| EP | 1 956 472 A1 | 8/2008 |
| GB | 2 344 894 A | 6/2000 |
| JP | 2011 034152 A | 2/2011 |
| WO | WO 2006/020304 A2 | 2/2006 |
| WO | WO 2007/063416 A2 | 6/2007 |
| WO | WO 2008/030972 | 3/2008 |
| WO | WO 2009 095072 A1 | 8/2009 |

OTHER PUBLICATIONS

Office Action for European Patent Application No. 10 843 654.4 dated Nov. 4, 2015.
Bubbles—a GUI for touchscreen mobiles—YouTube (undated) [online] [retrieved May 23, 2012]. Retrieved from the Internet: <URL: http://www.youtube.com/watch?v=gxUAj7MNoHk>. 2 pages.
International Preliminary Report on Patentability/Written Opinion for Application No. PCT/CN2010/070286 dated Jul. 24, 2012.
International Preliminary Report on Patentability/Written Opinion for Application No. PCT/CN2010/070509 dated Aug. 7, 2012.
International Search Report for Application No. PCT/CN2010/070286 dated Oct. 28, 2010.
International Search Report for Application No. PCT/CN2010/070509 dated Nov. 18, 2010.
Nokia Bubbles experimental prototype (Nokia Beta Labs)—YouTube (undated) [online] [retrieved May 23, 2012]. Retrieved from the Internet: <URL: http://www.youtube.com/watch?v=RSRuY_9ZMxY>. 2 pages.
Notice of Allowance for U.S. Appl. No. 13/522,915 dated May 22, 2015.
Notice of Allowance for U.S. Appl. No. 13/522,915 dated Sep. 10, 2015.
Office Action for Chinese Application No. 201080065441.X dated Mar. 5, 2014.
Office Action for Chinese Office Action for Application No. 201080065441.X, dated Jul. 18, 2013.

(56) References Cited

OTHER PUBLICATIONS

Office Action for European Application No. 10 843 654.4 dated May 22, 2014.
Office Action for European Patent Application No. 10 843 654.4 dated Feb. 12, 2015.
Office Action for U.S. Appl. No. 13/522,915 dated Aug. 11, 2014.
Office Action for U.S. Appl. No. 13/522,915 dated Dec. 18, 2014.
Office Action for U.S. Appl. No. 13/576,234 dated Jul. 21, 2014.
Review: Nokia X7 [Part 2] (Sep. 6, 2011) [online] [retrieved May 23, 2012]. Retrieved from the Internet: <URL: http://mobigyaan.com/review-nokia-x7-part-2>. 21 pages.
Supplementary European Search Report for Application No. 10843654.4 dated Aug. 14, 2013.
Video: Cool Custom "Bubble" UI for MeeGo on Notebook/Tablet Lenovo IdeaPad and N . . . (2012) [online] [retrieved May 23, 2012]. Retrieved from the Internet: <URL: http://mynokiablog.com/2010/11/25/video-cool-custom-bubble-ui-for-meego-on-notebooktablet-lenovo-ideapad-and-nokia-n900/>. 11 pages.
XMG 1.0 : Bubble UI—Android—YouTube (Dec. 15, 2010) [online] [retrieved May 23, 2012]. Retrieved from the Internet: <URL: http://www.youtube.com/watch?v=ihgl3njGhqM>. 2 pages.
Office Action for U.S. Appl. No. 13/576,234 dated Feb. 13, 2015.
Office Action for U.S. Appl. No. 13/576,234 dated Aug. 17, 2015.
Arrange Application Icons on the iPhone or iPod [online] [retrieved Jan. 18, 2016]. Retrieved from the Internet: <URL: http://www.mactips.info/2009/03/arrange-application-icons-on-the-iphone-or-ipod-touch>. (dated Mar. 18, 2009) 27 pages.
Office Action for Indonesian Application No. WO0201203363 dated Oct. 23, 2018, 4 pages.

* cited by examiner

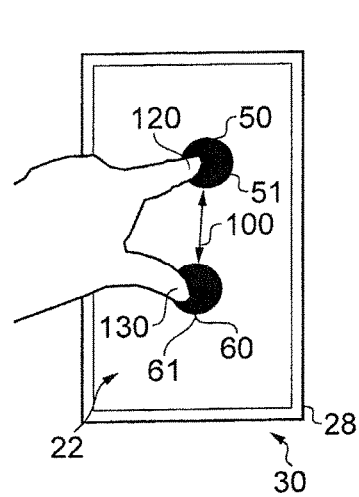
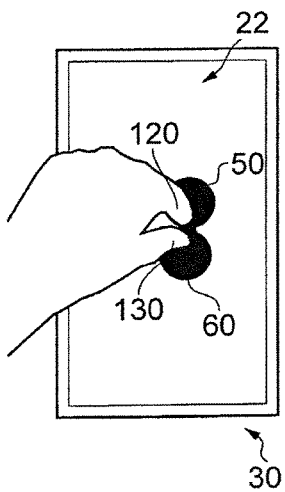
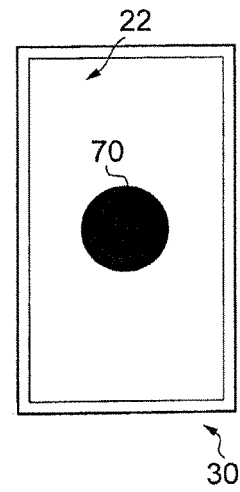
FIG. 4A    FIG. 4B    FIG. 4C
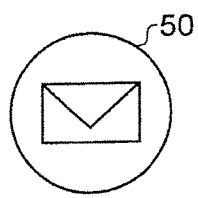
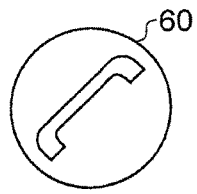
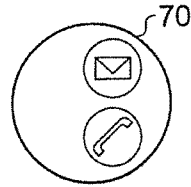
FIG. 5A    FIG. 5B    FIG. 5C
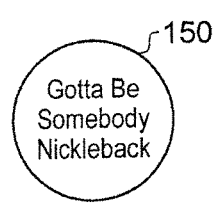
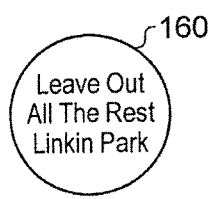
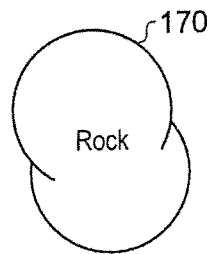
FIG. 6A    FIG. 6B    FIG. 6C

USER INPUT

CROSS REFERENCE TO RELATED APPLICATIONS

This application is a continuation of U.S. application Ser. No. 13/522,915 filed Jul. 18, 2012, which is a national stage 371 application of International Application No. PCT/CN2010/070286, filed Jan. 20, 2010, the entire contents of which are hereby incorporated by reference.

FIELD

Embodiments of the present invention relate to user input. In particular, they relate to organizing graphical menu items using a touch sensitive display.

BACKGROUND

Some electronic devices include a touch sensitive display. The touch sensitive display enables a user to provide user input by touching the touch sensitive display.

BRIEF DESCRIPTION OF VARIOUS EXEMPLARY EMBODIMENTS OF THE INVENTION

According to various, but not necessarily all, embodiments of the invention there is provided an apparatus, comprising: at least one processor; and at least one memory storing computer program instructions, the at least one processor being configured to execute the computer program instructions to cause the apparatus at least to perform: controlling a touch sensitive display to display a first graphical item at a first position and a second graphical item at a second position, the second graphical item being separated from the first graphical item by a first distance; detecting a first user digit at the first position and a second user digit at the second position; reducing the first distance by moving at least one of the first and second graphical items across the touch sensitive display, in response to detecting movement, across the touch sensitive display, of at least one of the first and second user digits; and controlling the touch sensitive display to display a third graphical item, after determining the first distance has been reduced such that the first graphical item is proximate the second graphical item.

According to various, but not necessarily all, embodiments of the invention there is provided a method, comprising: controlling a touch sensitive display to display a first graphical item at a first position and a second graphical item at a second position, the second graphical item being separated from the first graphical item by a first distance; detecting a first user digit at the first position and a second user digit at the second position; reducing the first distance by moving at least one of the first and second graphical items across the touch sensitive display, in response to detecting movement, across the touch sensitive display, of at least one of the first and second user digits; and controlling the touch sensitive display to display a third graphical item, after determining the first distance has been reduced such that the first graphical item is proximate the second graphical item.

According to various, but not necessarily all, embodiments of the invention there is provided a computer program comprising computer program instructions that, when executed by at least one processor, cause an apparatus at least to perform: controlling a touch sensitive display to display a first graphical item at a first position and a second graphical item at a second position, the second graphical item being separated from the first graphical item by a first distance; detecting a first user digit at the first position and a second user digit at the second position; reducing the first distance by moving at least one of the first and second graphical items across the touch sensitive display, in response to detecting movement, across the touch sensitive display, of at least one of the first and second user digits; and controlling the touch sensitive display to display a third graphical item, after determining the first distance has been reduced such that the first graphical item is proximate the second graphical item.

According to various, but not necessarily all, embodiments of the invention there is provided an apparatus, comprising: means for controlling a touch sensitive display to display a first graphical item at a first position and a second graphical item at a second position, the second graphical item being separated from the first graphical item by a first distance; means for detecting a first user digit at the first position and a second user digit at the second position; means for reducing the first distance by moving at least one of the first and second graphical items across the touch sensitive display, in response to detecting movement, across the touch sensitive display, of at least one of the first and second user digits; and means for controlling the touch sensitive display to display a third graphical item, after determining the first distance has been reduced such that the first graphical item is proximate the second graphical item.

According to various, but not necessarily all, embodiments of the invention there is provided a graphical user interface comprising: a first graphical item displayed at a first position on a touch sensitive display and a second graphical item displayed at a second position on the touch sensitive display, the second graphical item being separated from the first graphical item by a first distance, wherein placement of a first user digit at the first position and a second user digit at the second position causes at least one of the first and second graphical items to be identified for movement, and the first distance is reducible moving at least one of the first and second digits across the touch sensitive display; and a third graphical item is displayed on the touch sensitive display, after the first distance has been reduced such that the first graphical item is proximate the second graphical item.

BRIEF DESCRIPTION OF THE DRAWINGS

For a better understanding of various examples of embodiments of the present invention reference will now be made by way of example only to the accompanying drawings in which:

FIG. 4A illustrates an apparatus displaying first and second graphical items;
FIG. 4B illustrates the first and second graphical items after they have been moved by a user;
FIG. 4C illustrates an apparatus displaying a third graphical item;
FIG. 5A illustrates an exemplary first graphical item;
FIG. 5B illustrates an exemplary second graphical item;
FIG. 5C illustrates an exemplary third graphical item;
FIG. 6A illustrates another exemplary first graphical item;
FIG. 6B illustrates another exemplary second graphical item;

FIG. 6C illustrates another exemplary third graphical item;

DETAILED DESCRIPTION OF VARIOUS EXEMPLARY EMBODIMENTS OF THE INVENTION

Figure 1:
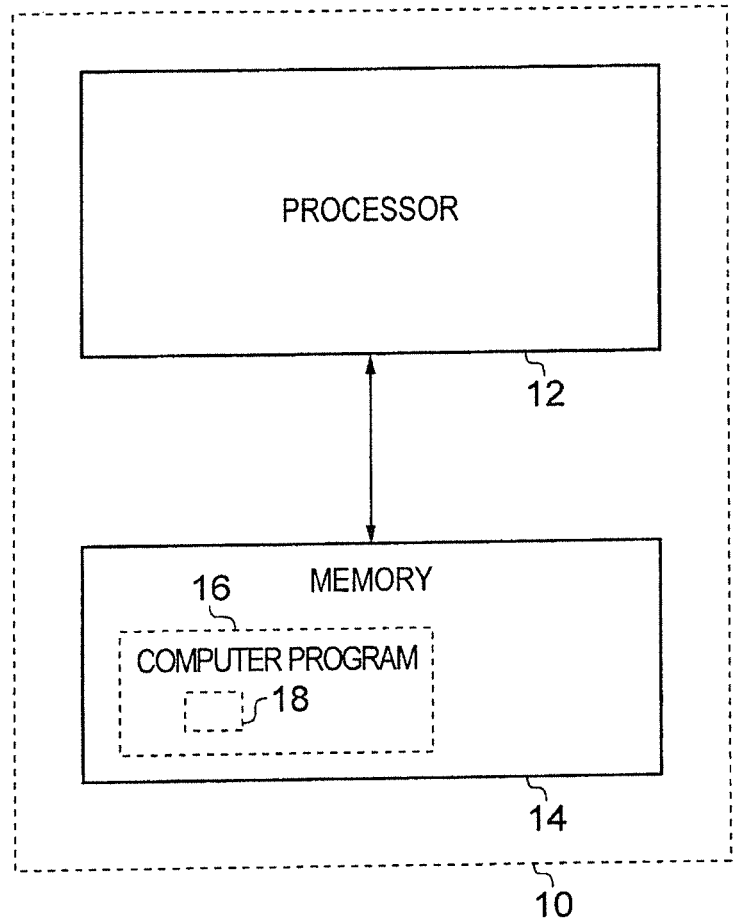
FIG. 1 illustrates an apparatus.

Embodiments of the invention relate to enabling a user to organize graphical menu items using a touch sensitive display. A touch sensitive display that detects multiple simultaneous touches is used to provide an intuitive user experience.

The Figures illustrate an apparatus 10/30, comprising: at least one processor 12; and at least one memory 14 storing computer program instructions 18, the at least one processor 12 being configured to execute the computer program instructions 18 to cause the apparatus 10/30 at least to perform: controlling a touch sensitive display 22 to display a first graphical item 50/150 at a first position 51 and a second graphical item 60/160 at a second position 61, the second graphical item 60/160 being separated from the first graphical item 50/160 by a first distance 100; detecting a first user digit 120 at the first position 51 and a second user digit 130 at the second position 61; reducing the first distance 100 by moving at least one of the first and second graphical items 50/150, 60/160 across the touch sensitive display 22, in response to detecting movement, across the touch sensitive display 22, of at least one of the first and second user digits 120, 130; and controlling the touch sensitive display 22 to display a third graphical item 70/170, after determining the first distance 100 has been reduced such that the first graphical item 50/150 is proximate the second graphical item 60/160.

FIG. 1 illustrates an apparatus 10. The apparatus may, for example, be a chip or a chip-set. The apparatus 10 illustrated in FIG. 1 comprises a processor 12 and a memory 14. In alternative embodiments of the invention, the apparatus 10 may comprise multiple processors.

The processor 12 is configured to read from and write to the memory 14. The processor 12 may also comprise an output interface via which data and/or commands are output by the processor 12 and an input interface via which data and/or commands are input to the processor 12.

Although the memory 14 is illustrated as a single component it may be implemented as one or more separate components, some or all of which may be integrated/removable and/or may provide permanent/semi-permanent/dynamic/cached storage.

The memory 14 stores a computer program 16 comprising computer program instructions 18 that control the operation of the apparatus 10/30 when loaded into the processor 12. The computer program instructions 18 provide the logic and routines that enables the apparatus 10/30 to perform the method illustrated in FIG. 3. The processor 12 by reading the memory 14 is able to load and execute the computer program instructions 18.

The computer program 16 may arrive at the apparatus 10/30 via any suitable delivery mechanism 40. The delivery mechanism 40 may be, for example, a tangible computer-readable storage medium, a computer program product, a memory device, a record medium such as a CD-ROM, DVD or Blu-Ray disc, or any article of manufacture that tangibly embodies the computer program 16. The delivery mechanism 40 may be a signal configured to reliably transfer the computer program 16.

Figure 2:
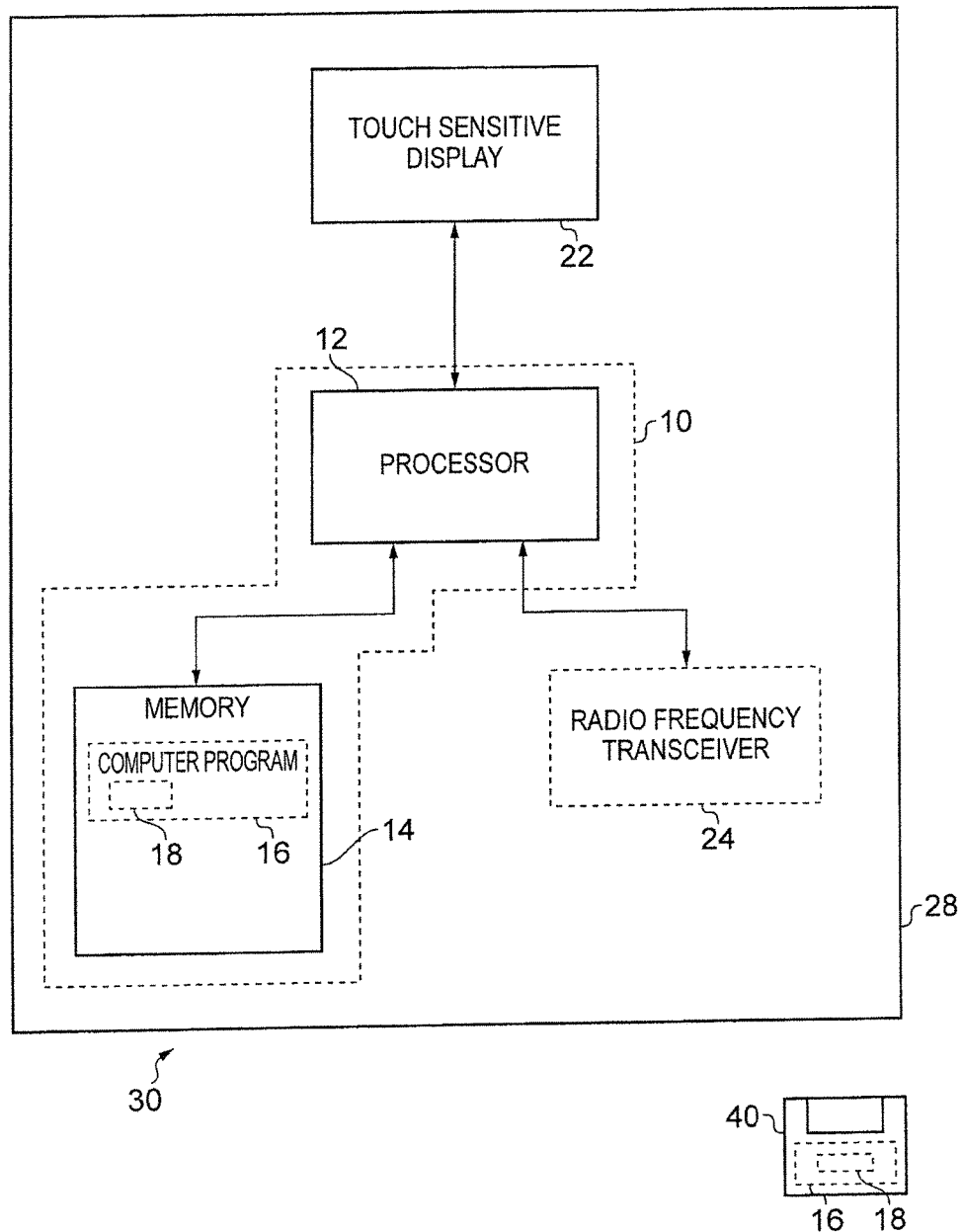
FIG. 2 illustrates a further apparatus.

FIG. 2 illustrates a further apparatus 30. The apparatus 30 illustrated in FIG. 2 may, for example, be a hand portable electronic device such as a mobile telephone, a personal music player, a personal digital assistant, a computer, a game console or a camera.

The apparatus 30 illustrated in FIG. 2 comprises the apparatus 10 illustrated in FIG. 1. The apparatus 30 further comprises a housing 28, a touch sensitive display 22 and optionally, a radio frequency transceiver 24. The housing 28 houses: the processor 12, the memory 14, a touch sensitive display 22 and the radio frequency transceiver 24. The elements 12, 14, 22 and 24 are co-located within the housing 28. The elements 12, 14, 22 and 24 are operationally coupled and any number or combination of intervening elements can exist (including no intervening elements).

The processor 12 is configured to provide outputs to the touch sensitive display 22 and the radio frequency transceiver 24. The processor 12 is configured to receive inputs from the radio frequency transceiver 24 and the touch sensitive display 22.

The touch sensitive display 22 is configured to provide a graphical user interface. The touch sensitive display 22 may be any type of touch sensitive display, such as a resistive touch sensitive display or a capacitive touch sensitive display. The touch sensitive display 22 is configured to detect multiple different touch inputs simultaneously.

The radio frequency transceiver 24 is configured to transmit and receive radio frequency signals. The radio frequency transceiver 24 may, for example, be a cellular transceiver that is compatible with one or more cellular protocols such as GSM (Global System for Mobile Communications), IS-95 (Interim Standard 95) or UMTS (Universal Mobile Telecommunications System). Alternatively, the radio frequency transceiver 24 may be a short range transceiver that is compatible with one or more short range protocols, such as Bluetooth protocols or IEEE (Institute of Electrical and Electronic Engineers) protocols. In some embodiments of the invention, the apparatus 30 comprises one or more cellular transceivers and one or more short range transceivers.

An exemplary method according to embodiments of the invention will now be described in relation to FIGS. 3 to 7C.

Figure 3:
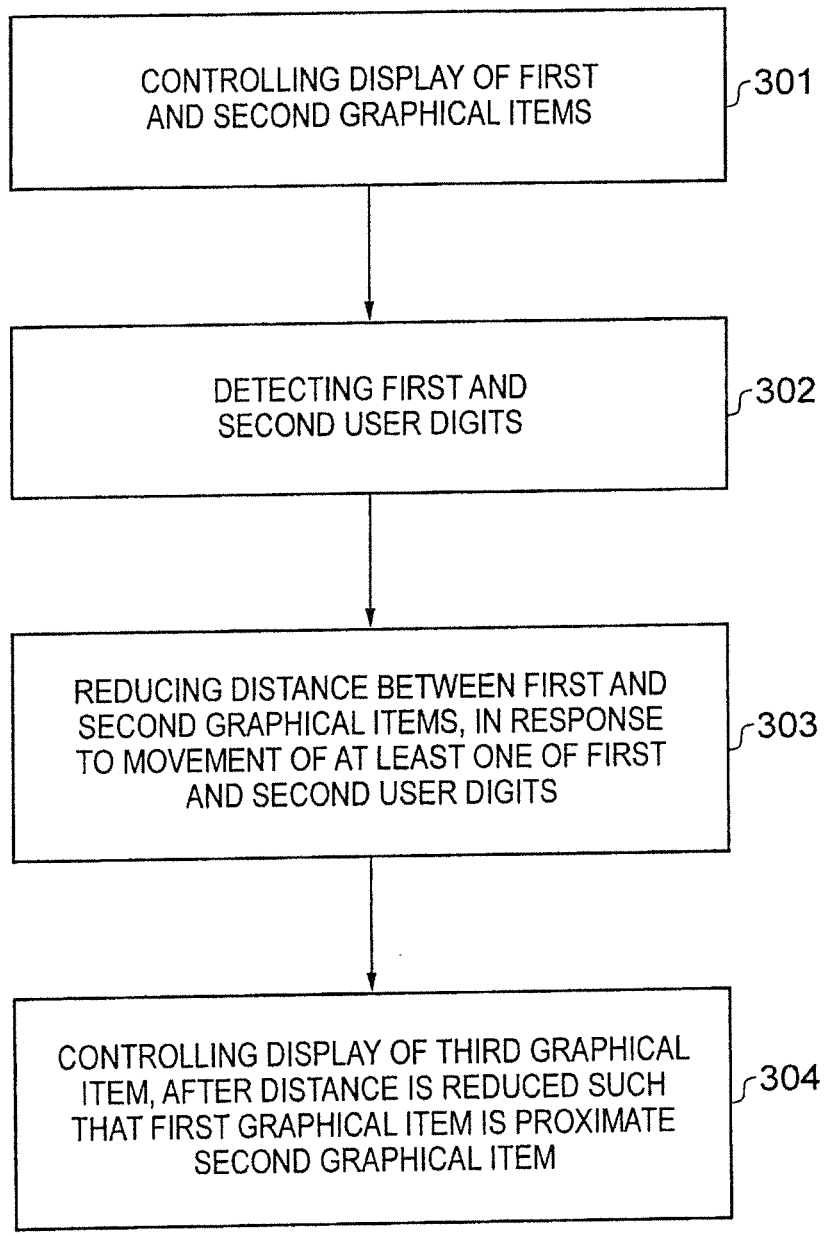
FIG. 3 illustrates a flow diagram of a method.

At block 301 of FIG. 3, the processor 12 controls the touch sensitive display 22 to display a first graphical item 50 at a first position 51 and a second graphical item 60 at a second position 61. The first graphical item 50 is separated from the second graphical item 60 by a first distance 100. FIG. 4A illustrates the first and second graphical items 50, 60 being displayed on the touch sensitive display 22.

In this example, the first graphical item 50 and the second graphical item 60 are individually selectable by a user. That is, the first graphical item 50 is selectable without selecting the second graphical item 60, and the second graphical item 60 is selectable without selecting the first graphical item 50.

A user may provide user input at the position 51, 61 of a graphical item 50, 60 which is interpreted by the processor 12 as selection of that graphical item 50, 60. The type of touch input that the processor 12 interprets as selection of a graphical item 50, 60 may be different in different embodiments of the invention. For example in some embodiments of the invention, the processor 12 may interpret a "double touch" at a graphical item 50, 60 as being a selection of that graphical item 50, 60. A "double touch" involves a user providing first and second touches in quick succession at the position 51, 61 of a graphical item 50, 60. The processor 12 is configured to interpret the first and second touches as a "double touch" if the time interval between the first and second touches is less than a threshold period of time.

In other embodiments of the invention, the processor 12 interprets a "single touch" at a graphical item 50, 60 as selection of that graphical item 50, 60.

The processor 12 is configured to perform an action in response to selection of a graphical item 50, 60. The action that is performed depends upon the graphical item 50, 60 that is selected. In this example, selection of the first graphical item 50 causes the processor 12 to perform a first function. Selection of the second graphical item 60 causes the processor 12 to perform a second function, which is different to the first function.

The first and second graphical items 50, 60 may relate to different software applications. Selection of the first graphical item 50 may cause the processor 12 to open a first software application. Selection of the second graphical item 60 may cause the processor 12 to open a second software application.

FIG. 5A illustrates an example of the first graphical item 50. In this example, the first graphical item 50 relates to a messaging software application. The graphical appearance of the first graphical item 50 in FIG. 5A indicates to the user that it relates to a messaging software application. Selection of the first graphical item 50 causes the processor 12 to open the messaging software application. The messaging software application may, for example, provide the user with access to sent and received messages.

FIG. 5B illustrates an example of a second graphical item 60. In this example, the second graphical item 60 relates to a call logs software application. The graphical appearance of the second graphical item 60 in FIG. 5B indicates to the user that it relates to a call logs software application. Selection of the second graphical item 60 causes the processor 12 to open the call logs software application. The call logs software application may, for example, provide the user with access to one or more call logs (for instance, a received calls log, a missed calls log, a dialed numbers log, etc).

The present method enables a user to create a third graphical item 70 by combining the first and second graphical items 50, 60. This is performed by moving the first graphical item 50 towards the second graphical item 60, by moving the second graphical item 60 towards the first graphical item 50, or by simultaneously moving the first and second graphical items 50, 60 towards one another.

Prior to moving a graphical item 50, 60, a user provides user input that causes the processor 12 to identify one or more graphical items for movement. The user input that is provided to identify a particular graphical item 50, 60 for movement is different to the user input that is provided to select that graphical item 50, 60.

For example, in embodiments of the invention where a "double touch" at a graphical item 50, 60 is interpreted as being a selection of that graphical item 50, 60, a single touch at that graphical item 50, 60 may cause the processor 12 to identify the graphical item 50, 60 for movement.

In embodiments of the invention of the invention where a single touch at a graphical item 50, 60 is interpreted as being a selection of that graphical item 50, 60, a prolonged touch (for longer than a threshold period of time) at the graphical item 50, 60 may cause the processor 12 to identify that graphical item 50, 60 for movement. Alternatively, some other form of user input (selection of a different graphical item on the display 22, or actuation of a key separate from the display 22) may be required before a single touch at a graphical item 50, 60 causes the processor 12 to identify that graphical item 50, 60 for movement.

At block 302 of FIG. 3, the user provides user input by placing a first user digit 120 at the first graphical item 50 (at the first position 51), and user input by placing a second user digit 130 at the second graphical item 60 (at the second position 61). In this example, the first user digit 120 is a finger and the second user digit is a thumb 130. FIG. 4A illustrates the first user digit 120 at the first position 51 and the second user digit 130 at the second position 61.

In some embodiments of the invention, only one of the first and second graphical items 50, 60 is movable. In this example, however, both the first and second graphical items 50, 60 are movable.

When the user touches the first graphical item 50 at the first position 51 using the first user digit 120, the processor 12 identifies the first graphical item 50 for movement. The processor 12 may indicate to the user that the first graphical item 50 has been identified for movement by highlighting the first graphical item 50, for example. Similarly, when the user touches the second graphical item 60 at the second position 61 using the second digit 130, the processor 12 identifies the second graphical item 60 for movement. The processor 12 may indicate to the user that the second graphical item 60 has been identified for movement by highlighting the second graphical item 60, for example.

Once a graphical item 50, 60 has been identified for movement using a user digit 120, 130, movement of the user digit 120, 130 across the display 22 (and without removing the user digit 120, 130 from the display 22) causes the graphical item 50, 60 to move around the display 22 concurrently with the user digit 120, 130. That is, the user may drag the graphical item 50, 60 around the display 22 by moving the user digit 120, 130 across the display 22.

In the example illustrated in FIGS. 4A and 4B, at block 303 of FIG. 3 the user performs a "pinching movement" by moving his finger 120 and his thumb 130 towards one another. The processor 12 detects movement of the finger 120 across the display 22 towards the second graphical item 60, and controls the display 22 to move the first graphical item 50 concurrently with the finger 120, towards the second graphical item 60. For example, the processor 12 may control the display 22 so that the first graphical item 50 remains proximal (for instance, at least partially underneath) the portion of the finger 120 in contact with the display 22.

The processor 12 also detects movement of the thumb 130 across the display 22 towards the first graphical item 50, and controls the display 22 to move the second graphical item 60 concurrently with the thumb 130, towards the first graphical item 50. For example, the processor 12 may control the display 22 so that the second graphical item 60 remains proximal (for instance, at least partially underneath) the portion of the thumb 130 in contact with the display 22.

Since the user moves the finger 120 and the thumb 130 towards one another simultaneously, the processor 12 moves the first and second graphical items 50, 60 towards one another simultaneously. The processor 12 reduces the distance 100, on the display 22, between the first and second graphical items 50, 60 by moving the first and second graphical items 50, 60 towards one another.

In embodiments of the invention where one of the graphical items 50, 60 is not moved (or is not movable), movement of only one of the graphical items 50, 60 results in the distance 100 between the graphical items 50, 60 being reduced.

In some embodiments of the invention, when the processor 12 determines that the first graphical item 50 is proximate the second graphical item 60, it controls the display 22 to display an overlap or a coalescence of the first and second graphical items 50, 60. FIG. 4B illustrates an embodiment of the invention in which the processor 12 controls the display 22 to display a coalescence of the first and second graphical items 50, 60.

The processor 12 may determine that the first graphical item 50 is proximate the second graphical item 60 when the distance 100 between them is less than a threshold value. The threshold value may, for example, be zero or non-zero.

In some embodiments of the invention, after the display 22 has displayed an overlap or a coalescence of the first and second graphical items 50, 60, the user may increase the distance 100 between the first and second graphical items 50, 60 by maintaining his digits 120, 130 at the display 22 and separating them. When the processor 12 detects that the first graphical item 50 is no longer proximal to the second graphical item 60, it controls the display to remove the overlap or coalescence.

In this example, when the user has moved the first graphical item 50 and/or the second graphical item 60 such that the first graphical item 50 is proximal to the second graphical item 60 (as illustrated in FIG. 4B), he removes his digits 120, 130 from the display 22.

At block 304 of FIG. 3, the processor 12 detects that the digits 120, 130 have been removed from the display 22 while the first graphical item 50 is proximal to the second graphical item 60. In response, the processor 12 controls the display 22 to display a third graphical item 70, which is different to the first and second graphical items 50, 60. This is illustrated in FIG. 4C.

In this example, when the processor 12 controls the display 22 to display the third graphical item 70, it also controls the display 22 to remove the first and second graphical items 50, 60. In other words, the processor 12 groups together the first and second graphical items 50, 60 by replacing them on the display 22 with the third graphical item 70. The graphical appearance of the third graphical item 70 may indicate to the user that it relates to a combination of the first and second graphical items 50, 60.

FIG. 5C illustrates an example of the third graphical item 70. In this example, the third graphical item 70 includes the graphical appearance of the first graphical item 50 and the second graphical item 60 on a smaller scale than the first and second graphical items 50, 60.

Figure 7C:
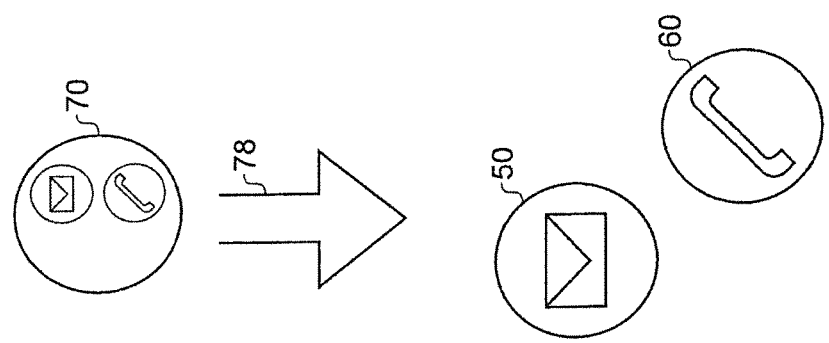
FIG. 7C illustrates an action performed in response to selection of a third graphical item.
Figure 7B:
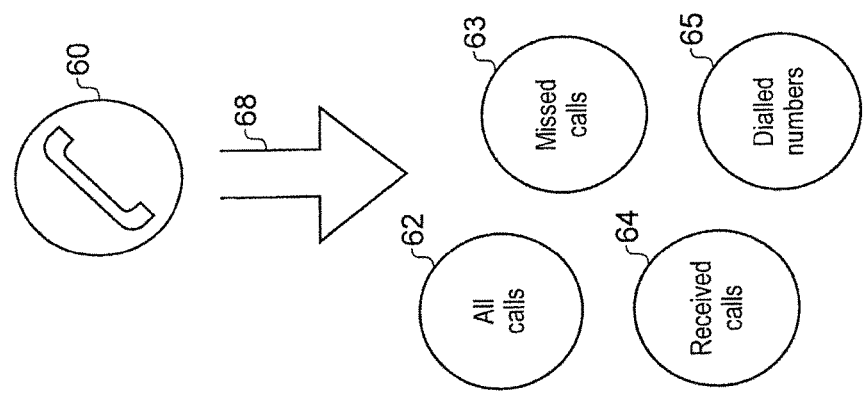
FIG. 7B illustrates an action performed in response to selection of a second graphical item.
Figure 7A:
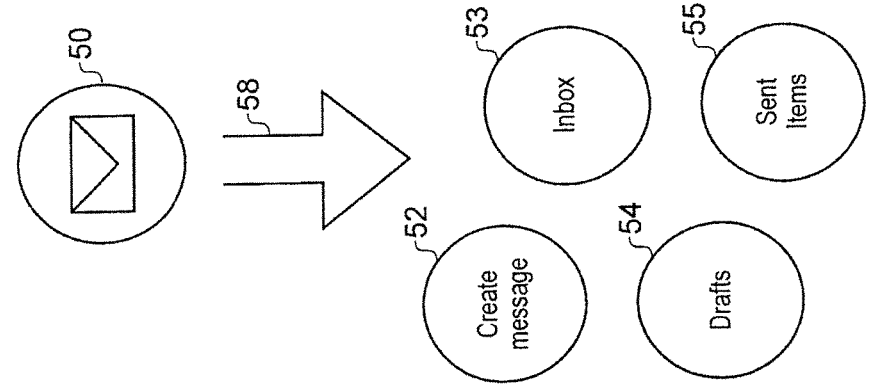
FIG. 7A illustrates an action performed in response to selection of a first graphical item.

FIGS. 7A, 7B and 7C illustrate the actions that the processor 12 performs when the exemplary first, second and third graphical items 50, 60, 70 in FIGS. 5A to 5C are selected.

In this example, the processor 12 is configured to provide a menu having a hierarchical structure. The first and second graphical items 50, 60 are individually selectable items in a particular level of the menu. The third graphical item 70 is an individually selectable item in a different (higher) level of the menu from the first and second graphical items 50, 60.

The third graphical item 70 may provide the user with access to the first and second graphical items 50, 60. FIG. 7C indicates an example in which selection of the third graphical item 70 (as indicated by the arrow 78) causes the processor 12 to control the display 22 to display the first and second graphical items 50, 60, which are then individually selectable. The third graphical item 70 may be removed from display after selection.

FIG. 7A illustrates a plurality of graphical items 52-55 that are at a lower level in the menu structure than the first graphical item 50, and are accessible via the first graphical item 50. The graphical items 52-55 are presented to the user in response to the selection of the first graphical item 50. Selection of the first graphical item 50 is indicated by the arrow 58 in FIG. 7A.

FIG. 7B illustrates that a plurality of graphical items 62-65 that are at a lower level in the menu structure than the second graphical item 60, and are accessible via the second graphical item 60. The graphical items 62-65 are presented to the user in response to the selection of the second graphical item 62-65. Selection of the second graphical item 60 is indicated by the arrow 68 in FIG. 7B.

Advantageously, embodiments of the invention enable a user to organize graphical items according to his preferences, in an intuitive manner. For example, if a user does not select the first and second graphical items 50, 60 very often, he may choose to group the first and second graphical items 50, 60 together and create a third graphical item 70. Removal of the first and second graphical items 50, 60 when the third graphical item 70 is generated creates space on the display 22 that can be used to display graphical items which are selected more frequently by the user.

FIGS. 6A to 6C illustrate alternative first, second and third graphical items 150, 160, 170 to those illustrated in FIGS. 5A to 5C. FIGS. 6A to 6C relate to alternative embodiments of the invention in which the first and second graphical items 150, 160 are combined to create a playlist.

In these embodiments of the invention, the first graphical item 150 represents first media content, and the second graphical item 160 represents second media content. The first and second media content may be audio content (such as music files), visual content (such as image files) or audiovisual content (such as video files). In this particular example, the first and second media content is audio content.

The graphical appearance of the first graphical item 150 illustrated in FIG. 6A indicates to the user that it relates to first audio content which, in this example, is the song "Gotta Be Somebody" by Nickelback. Similarly, the graphical appearance of the second graphical item 160 indicates to the user that it relates to second audio content which, in this example, is the song "Leave Out All The Rest" by Linkin Park.

The first and second graphical items 150, 160 may be individually selectable. For instance, selection of the first graphical item 150 may cause the processor 12 to control an audio output device to playback the first audio content. Selection of the second graphical item 160 may cause the processor 12 to control an audio output device to playback the second audio content.

A user may combine the first and second graphical items 150, 160 illustrated in FIGS. 6A and 6B in the manner described above in relation to FIGS. 3 to 4C. When this combination is performed, the processor 12 controls the display 22 to display the third graphical item 170 illustrated in FIG. 6C. The third graphical item 170 relates to a playlist containing the first and second audio content. The first and second audio content is accessible via the third graphical item 170. For example, selection of the third graphical item 170 may cause the processor 12 to control an audio output device to playback the first and second audio content sequentially.

When the processor 12 controls the display 22 to display the third graphical item 170, it may or may not remove the first and second graphical items 50, 60 from display.

When the processor 12 controls the display to display the third graphical item 170, it may also control the display 22 to display a prompt, requesting that the user names the playlist. For instance, the processor 12 may control the display 22 to display a virtual keyboard that enables the user to name the playlist. In the example illustrated in FIG. 6C, the playlist has been named "Rock".

The first and second graphical items 150, 160 may be considered to be part of a particular level in a hierarchical menu structure. The third graphical item 170 may be considered to be in a different (higher) level of the hierarchical menu structure from the first and second graphical items 150, 160.

Advantageously, the embodiments of the invention illustrated in FIGS. 6A to 6C enable a user to organize his media content in an intuitive manner.

Figure 8A:
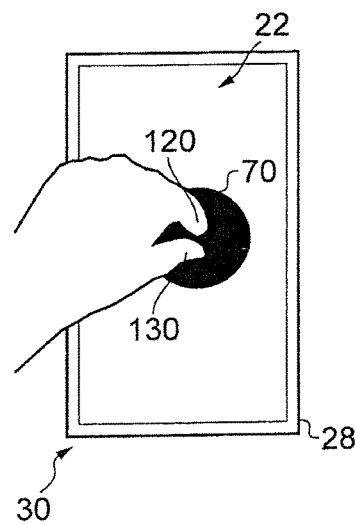
FIG. 8A illustrates an apparatus displaying a third graphical item.
Figure 8B:
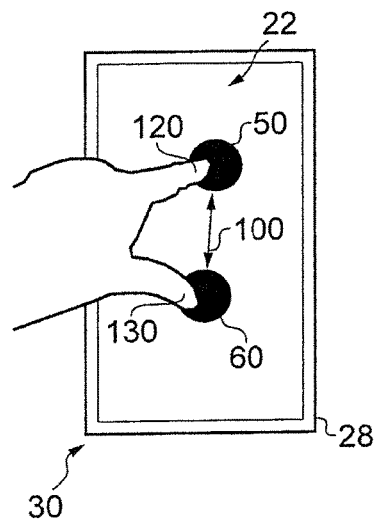
FIG. 8B illustrates an apparatus displaying first and second graphical items.

FIGS. 8A and 8B relate to embodiments of the invention in which a user may "ungroup" graphical items that are grouped together. For example, the user may "ungroup" graphical items that he previously grouped together in the manner described above in relation to FIGS. 3 to 7C.

FIG. 8A illustrates an example in which the processor 12 is controlling the display 22 to display the third graphical item 70 illustrated in FIG. 4C. The third graphical item 70 relates to a combination of the first and second graphical items 50, 60 illustrated in FIG. 4A.

In order to ungroup the first and second graphical items 50, 60, the user places first and second user digits 120, 130 at the third graphical item 70. In this example, the first user digit 120 is a finger and the second user digit 130 is a thumb. When the processor 12 detects the first and second user digits at the display 22, it identifies the third graphical item 70 for ungrouping.

In this particular example, after the third graphical item 70 has been identified for ungrouping, the user simultaneously moves the finger 120 and the thumb 130 away from one another while maintaining them at the display 22. The processor 12 detects the movement of the finger 120 and the thumb across the display 22. Once the processor 12 detects that the finger 120 and thumb 130 are more than a threshold distance away from one another, it controls the display 22 to display the first and second graphical items 50, 60, and to remove the third graphical item 70 from display. The first graphical item 50 is displayed on the display 22 at the position of the finger 120, and the second graphical item 60 is displayed on the display 22 at the position of the thumb 130.

The processor 12 responds to subsequent movement of the finger 120 (while maintaining it at the display 22) by moving the first graphical item 50 so that it remains proximal (for instance, at least partially underneath) the portion of the finger 120 in contact with the display 22. This enables the user to position the first graphical item 50 at an appropriate place on the display 22.

The processor 12 responds to subsequent movement of the thumb 130 (while maintaining it at the display 22) by moving the second graphical item 60 so that it remains proximal (for instance, at least partially underneath) the portion of the thumb 130 in contact with the display 22. This enables the user to position the second graphical item 60 at an appropriate place on the display 22. FIG. 8B illustrates the first and second graphical items 50, 60 after they have been ungrouped and separated by a distance 100.

In some embodiments of the invention, it is not necessary for a user to move the finger 120 and the thumb 130 away from one another simultaneously in order to perform "ungrouping". For example, instead a user may hold either the finger 120 or the thumb 130 stationary and move the other digit 130/120.

References to 'a tangible computer-readable storage medium', 'a computer program product', a 'computer', and a 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The blocks illustrated in the FIG. 3 may represent steps in a method and/or sections of code in the computer program 16. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For example, the first, second and third graphical items 50/150, 60/160 and 70/170 may have a different size and/or shape to those illustrated in FIGS. 5A to 6C. In some embodiments of the invention, the size and shape of some or all of the displayed graphical items 50/150, 60/160, 70/170 may be different to one another.

The description above describes grouping first and second graphical items 50/150, 60/160 to create a third graphical item 70/170. In some embodiments of the invention, it is possible for a user to add further items to the group by performing the actions described above (and illustrated in FIGS. 4A and 4B). For example, a user may combine a fourth graphical item with the third graphical item 70 to create a new, fifth graphical item. The fifth graphical item represents a combination of the first, second and fourth graphical items. In some embodiments of the invention, the fourth graphical item may have been created in response to a user grouping items that were previously presented on the display 22 as individual items.

In the context of the FIGS. 5A to 5C example, the fourth graphical item may represent, for instance, a contacts software application and/or an internet browsing software application. In the context of the FIGS. 6A to 6C example, the fourth graphical item may represent, for instance, an item of media content or a playlist for media content.

It will also be appreciated by those skilled in the art that it may not be necessary for a user to physically touch the display 22 in order to provide user input. For example, in some embodiments of the invention, the display 22 may utilize capacitive sensing technology. In these embodiments, the display 22 may detect user input when a user places a digit close to, but not at, the display 22.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus, comprising:
   at least one processor; and
   at least one memory storing computer program instructions configured, working with the at least one processor, to cause the apparatus to:
   cause a touch sensitive display to display a first graphical item and a second graphical item, wherein the first graphical item is at a first position, the second graphical item is at a second position and the second graphical item is separated from the first graphical item by a first distance that is greater than a threshold value, and wherein first touch input at the first position causes a first software application to be opened, second touch input at the first position causes the first graphical item to be identified for movement, third touch input at the second position causes a second software application to be opened, and fourth touch input causes the second graphical item to be identified for movement;
   respond to the second touch input, at the first position, by identifying the first graphical item for movement;
   cause the touch sensitive display to indicate visually that the first graphical item has been identified for movement;
   create a hierarchical structure, after determining that the first distance has been reduced such that the first graphical item is within a distance of the second graphical item that is less than the threshold value, in which the first and second graphical items are grouped together and represented by a third graphical item on the touch sensitive display; and
   respond to selection of the third graphical item by providing access to the first graphical item, which is selectable to open the first software application, and the second graphical item, which is selectable to open the second software application.

2. The apparatus of claim 1, wherein the first touch input is touch input for less than a threshold period of time and the second touch input is touch input for greater than a threshold period of time.

3. The apparatus of claim 2, wherein the third touch input is touch input for less than a threshold period of time and the fourth touch input is touch input for greater than a threshold period of time.

4. The apparatus of claim 1, wherein the computer program instructions are configured, working with the at least one processor, to cause the apparatus to: enable the user to ungroup the first graphical item and the second graphical item by moving the first graphical item from the second graphical item by a distance that is greater than the threshold value.

5. The apparatus of claim 1, wherein the first distance is reduced by moving the first graphical item towards the second graphical item in response to user input at the touch sensitive display.

6. The apparatus of claim 1, wherein the first distance is reduced by moving the first graphical item concurrently with a user digit across the touch sensitive display, without the user digit being removed from the touch sensitive display after the second touch input at the first position is provided using the user digit.

7. The apparatus of claim 6, wherein the second graphical item is stationary while the first graphical item moves concurrently with the user digit across the touch sensitive display.

8. The apparatus of claim 6, wherein the computer program instructions are configured, working with the at least one processor, to cause the apparatus to: cause a coalescence of the first and second graphical items to be displayed on the touch sensitive display after determining that the first distance has been reduced such that the first graphical item is within a distance of the second graphical item that is less than the threshold value.

9. The apparatus of claim 1, wherein the first and second graphical items are removed from display after displaying the third graphical item on the touch sensitive display.

10. The apparatus of claim 1, further comprising the touch sensitive display.

11. A method, comprising:
    causing a touch sensitive display to display a first graphical item and a second graphical item, wherein the first graphical item is at a first position, the second graphical item is at a second position and the second graphical item is separated from the first graphical item by a first distance that is greater than a threshold value, and wherein first touch input at the first position causes a first software application to be opened, second touch input at the first position causes the first graphical item to be identified for movement, third touch input at the second position causes a second software application to be opened, and fourth touch input causes the second graphical item to be identified for movement;
    responding to the second touch input, at the first position, by identifying the first graphical item for movement;
    causing the touch sensitive display to indicate visually that the first graphical item has been identified for movement;
    creating a hierarchical structure, after determining that the first distance has been reduced such that the first graphical item is within a distance of the second graphical item that is less than the threshold value, in which the first and second graphical items are grouped together and represented by a third graphical item on the touch sensitive display; and
    responding to selection of the third graphical item by providing access to the first graphical item, which is selectable to open the first software application, and the second graphical item, which is selectable to open the second software application.

12. The method of claim 11, wherein the first touch input is touch input for less than a threshold period of time and the second touch input is touch input for greater than a threshold period of time.

13. The method of claim 12, wherein the third touch input is touch input for less than a threshold period of time and the fourth touch input is touch input for greater than a threshold period of time.

14. The method of claim 11, further comprising: enabling the user to ungroup the first graphical item and the second graphical item by moving the first graphical item away from the second graphical item by a distance that is greater than the threshold value.

15. The method of claim 11, wherein the first distance is reduced by moving the first graphical item towards the second graphical item in response to user input at the touch sensitive display.

16. The method of claim 11, wherein the first distance is reduced by moving the first graphical item concurrently with a user digit across the touch sensitive display, without the user digit being removed from the touch sensitive display after the second touch input at the first position is provided using the user digit.

17. The method of claim 16, wherein the second graphical item is stationary while the first graphical item moves concurrently with the user digit across the touch sensitive display.

18. A non-transitory computer readable medium storing computer program instructions configured, working with at least one processor, to cause at least the method as claimed in claim 11 to be performed.

19. An apparatus, comprising:
at least one processor; and
at least one memory storing computer program instructions configured, working with the at least one processor, to cause the apparatus to:
cause a touch sensitive display to display a menu comprising a first graphical item, selectable to open a first software application, and a second graphical item, selectable to open a second software application, wherein the first graphical item is at a first position, the second graphical item at a second position and the second graphical item is separated from the first graphical item by a first distance that is greater than a threshold value;
detect a first user digit at the first position;
reduce the first distance by moving the first graphical item across the touch sensitive display in response to detecting movement, across the touch sensitive display, of the first user digit;
create a hierarchical structure in the menu, after determining that the first distance has been reduced such that the first graphical item is within a distance of the second graphical item that is less than the threshold value, the hierarchical structure comprising the first graphical item, the second graphical item and a third graphical item representing a grouping of the first and second graphical items, wherein the third graphical item is in a first level in the hierarchical structure and the first and second graphical items are in a second level of the hierarchical structure, different from the first level in the hierarchical structure; and
respond to selection of the third graphical item in the first level of the hierarchical structure by providing access to the second level in the hierarchical structure, in which the first graphical item is selectable to open the first software application and the second graphical item is selectable to open the second software application.

20. The apparatus of claim 19, wherein the computer program instructions are configured, working with the at least one processor, to cause the apparatus to: detect user input, provided prior to moving the first graphical item across the touch sensitive display, which identifies the first graphical item for movement, wherein the user input that identifies the first graphical item for movement is different from the user input that is provided to select the first graphical item.

* * * * *